United States Patent [19]

Philipp

[11] Patent Number: 5,066,625

[45] Date of Patent: Nov. 19, 1991

[54] METHOD OF MAKING CONTAMINATION-FREE CERAMIC BODIES

[75] Inventor: Warren H. Philipp, Olmsted Township, Cuyahoga County, Ohio

[73] Assignee: The United States of America as represented by the Administrator of the National Aeronautics and Space Administration, Washington, D.C.

[21] Appl. No.: 610,883

[22] Filed: Nov. 9, 1990

[51] Int. Cl.⁵ .............................................. C04B 35/10
[52] U.S. Cl. .................................... 501/127; 501/123; 423/630; 264/63
[58] Field of Search ................. 264/63; 501/127, 153; 423/630, 631

[56] References Cited

U.S. PATENT DOCUMENTS

| 4,562,050 | 12/1985 | Koeda et al. | 423/290 |
| 4,800,183 | 1/1989 | Quinby | 501/96 |
| 4,952,533 | 8/1990 | Hongu | 501/90 |

Primary Examiner—William R. Dixon, Jr.
Assistant Examiner—Chris Gallo
Attorney, Agent, or Firm—James A. Mackin; John R. Manning; Gene E. Shook

[57] ABSTRACT

Ceramic structures having high strength at temperatures above 1000° C. after sintering are made by mixing ceramic powders with binder deflocculants such as guanidine salts of polymeric acids, guanidine salts of aliphatic organic caboxylic acids or guanidine alkylsulfates with the foregoing guanidine salts.

14 Claims, No Drawings

METHOD OF MAKING CONTAMINATION-FREE CERAMIC BODIES

ORIGIN OF THE INVENTION

The invention described herein was made by an employee of the United States Government and may be manufactured and used by or for the Government for governmental purposes without the payment of any royalties thereon or therefor.

FIELD OF THE INVENTION

This invention relates to ceramic materials and is directed more particularly to a method of making ceramic structures having high strength at temperatures in excess of 1000° C.

BACKGROUND OF THE INVENTION

Ceramics are generally defined as metal oxides used in making structural articles and electrical devices. Such oxides include $TiO_2$, $ZrO_2$, $Al_2O_3$, $Y_2O_3$, BeO, MgO, $SiO_2$ and the rare earth oxides such as $Ce_2O_3$, and $La_2O_3$. Also considered to be ceramics are mixed oxides which include not only mixtures of structural oxides, but hydroxometallate compounds such as silicates, aluminates, titanates, etc. including hydrometallates of CaO, SrO and BaO. In recent years the definition of ceramics has been broadened to include carbides, nitrides and borides, as for example SiC, $Si_3N_4$, AlN, ZrB, etc.

For centuries, ceramic materials have been used for dishes, pots and tiles. More recently, these items were made by forming the desired article from a mixture of ceramic particles and a binder-deflocculant processing aid. The article was then fired in a kiln.

The processing aids used with the ceramics to make pots, pottery, etc. contain various contaminants which do not alter the useful properties of the articles which are used at relatively low temperatures, i.e., well below 1000° C. However, such contaminants seriously weaken ceramic materials which would be used at temperatures above 1000° C.

Within the last decade, advances in apparatus such as turbine engines are based, in part, on operation at higher temperatures. Thus, the turbine blades of a turbine engine may be subjected to high temperatures above 1000° C. As metal blades cannot withstand these temperatures, ceramic materials are now being investigated for these and other high temperature structures.

In making high temperature structures such as turbine blades, a ceramic material is mixed with a binder-deflocculant, formed into the desired shape and then fired to sinter the ceramic material into a cohesive body. Prior art binder-deflocculant processing aids include alkali metal salts of organic fatty acids which are salts of strong bases, the most common being Na salt of an organic fatty acid or a polymeric acid. Sodium or potassium alkylsulfates are also utilized as binder-deflocculants.

The problem with the prior art processing aids is that after the ceramic article is fired at a temperature great enough to sinter the ceramic material, a contaminant such as sodium, potassium or other metal residue of the processing additive remains. Firing the article at a still greater temperature will drive off some of the contaminants but there is always a residual amount which has a deleterious effect on the high temperature strength of the article.

U.S. Pat. No. 4,562,050 to Koeda et al discloses a process for producing boron nitride of high purity by employing guanidine or similar compounds, guanidine chloride, a weak base, being specifically mentioned.

U.S. Pat. No. 4,800,183 to Quinby discloses the making of a nitride powder by heating a solvent containing a metal salt and melamine until a metal-melamine precipitate forms. The precipitate is calcined at a temperature below 700° C.

DISCLOSURE OF THE INVENTION

It is an object of the invention to make a ceramic structure having high strength at temperatures above 1000° C.

It is another object of the invention to provide a method for making a ceramic body which has no undesirable metal contaminants.

Still another object of the invention is to provide a method for making a high temperature ceramic, in which method the processing aid contaminants are eliminated below the sintering temperature of the ceramic material.

In accordance with the invention, guanidine (G) is substituted for Na, K or the like salts used in the prior art as reagents for ceramic processing G, being entirely organic, leaves no residue when a ceramic structure is sintered. The invention further includes the substitution of G alkylsulfates for Na or K alkylsulfates often used in ceramic processing.

DISCLOSURE OF THE BEST EMBODIMENT

According to the invention, the free base, guanidine, is the major starting material for the synthesis of guanidine derivatives. The guanidine is prepared by reacting an alcoholic solution (absolute ethanol) of a soluble guanidine salt (guanidine hydrochloride, GHCl) with the stoichiometric quantity of a sodium alkoxide, such as sodium ethoxide, in absolute ethanol solution. The sodium ethoxide solution is made by reacting sodium with absolute ethanol according to the equation:

$$2Na + 2C_2H_5OH = 2C_2H_5ONa + H_2$$

The sodium ethoxide solution is then added to the well stirred GHCl solution and insoluble NaCl precipitates leaving guanidine in solution according to the equation:

$$GHCl + C_2H_5ONa = G + NaCl + C_2H_5OH.$$

The G reacts with water to form the strong base guanidine hydroxide, GHOH, according to the equation:

$$G + H_2O = GHOH.$$

Other appropriate metal alkoxides may be used to synthesize guanidine such as the methoxide, isopropoxide and propoxide of Na or K as well as other guanidine salts as long as the guanidine salt is soluble in the selected alcohol and the corresponding Na or K salt precipitates out of the alcohol. The system GHCl, $C_2H_5ONa$ in absolute ethanol was found to be convenient for this synthesis.

Although the invention applies mainly to ceramics for high temperature use, the spirit and scope of the invention also apply to other uses of ceramics where group 1 alkali metals, Li, Na, K, Rb and Cs contamination in the final product is undesirable. Such ceramic applications include fabrication of electronic, superconducting, semiconducting and insulating devices. Other uses of G salts of organic fatty acids include metal and polymer processing.

Guanidine polyelectrolytes having a molecular weight of 1000 to 5,000,000 are useful deflocculants and binders for ceramic processing. They are also useful in slip casting to provide sufficient dispersion as well as fluidity to slip casting oxide slurries such as in the slip casting of alumina, $Al_2O_3$ for example. In addition, guanidine salts of polyacids are good binders providing adequate green strength to the ceramic casting before firing.

The invention also encompasses the use of guanidine salts of other organic carboxylic acids and organic sulfates in ceramic processing. These salts, as well as salts of polyacids, can serve as dispersants and binders for ceramic paints to coat substrates. These coatings may be used as thermal barriers or as protective coatings against environmental oxidation.

The guanidine polyectrolytes include guanidine salts of polyacrylic acid, polymethacrylic acid and carboxymethylcellulose. Organic acids other than the polymeric acids include straight chain and branched chain carboxylic acids such as guanidine salts of stearic acid, oleic acid, linoleic acid, and, in general, those acids with nine or more carbon atoms per molecule, nine to twenty atoms per molecule being preferred. The invention also includes guanidine salts of organic sulfates such as those used in making detergents. These organic sulfates may be alkyl, allyl and aryl sulfates. The organic sulfates have the general formula $ROSO_2OH$, where R is the organic group.

The guanidine salts are synthesized by neutralizing the organic acid or polyacid with guanidine hydroxide according to the formula:

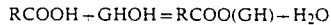

$$RCOOH + GHOH = RCOO(GH) + H_2O$$

They may also be prepared by reaction of the ammonium salt with guanidine hydroxide.

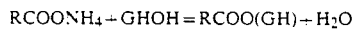

$$RCOONH_4 + GHOH = RCOO(GH) + H_2O$$

where R is the organic group.

The binder-defloculant guanidine salt processing aids embodying the invention are mixed with ceramic powders in the amount of from about 0.5 weight % to about 5 weight %. About 2 weight % is the preferred amount of binder-defloculant to be used in the method of the instant invention.

EXAMPLES

Example 1

High molecular weight guanidine polyacrylate (M.W. 1,000,000) has been found to be an excellent binder for cold pressed ceramic powders providing good green strength to ceramic articles prior to firing. Excellent green strength was obtained on cold pressing 10000 psig 0.05u alumina ($Al_2O_3$), polishing powder containing about 2% by weight of the polyelectrolyte.

Guanidine polyacrylate is synthesized by adding the stoichiometric amount of a guanidine hydroxide solution to 10% aqueous polyacrylic acid to completely neutralize the polyacid. Enough guanidine hydroxide should be added to give an alkaline phenolphthalein end point. Enough water is added to give a 5% G-polyacrylate solution. The specified amount of the G-polyacrylate solution is mixed with the oxide powder so that the mixture contains about 2% by weight of the polyelectrolyte.

Example 2

The polyelectrolyte, low molecular weight guanidine polymethacrylate (M.W. about 5,000) was found to be a good dispersant for aqueous slurries of many ceramic oxide powders. Dispersions of submicron $Al_2O_3$ and $Y_2O_3$, containing about 2% of this polyelectrolyte were used as paints for coating substrates with $Al_2O_3$ and $Y_2O_3$. This polyelectrolyte also has application as a processing aid in slip casting. G-polymethacrylate was prepared by neutralizing a 25% aqueous solution of polymethacrylic acid with the calculated stoichiometric amount of a guanidine hydroxide solution. After the addition of guanidine hydroxide, the solution should be alkaline to phenolphthalein, indicator.

Example 3

Guanidine salts of fatty organic acids (guanidine soaps) are good surface active agents useful in the various operations of ceramic processing. Typically, G-oleate is synthesized by the addition of the stoichiometric amount of guanidine hydroxide, GHOH, in ethanol solution to a 20% solution of Oleic acid in ethanol. One mole of GHOH is required to neutralize one mole of oleic acid. The resulting G-oleate solution is evaporated at 100° C. to remove most of the solvent. The G-oleate solidifies on cooling to 0° C. Other guanidine salts of organic fatty acids are made by a similar method.

It will be understood that changes and modifications may be made to the above-described invention without departing from its spirit and scope as set forth in the claims appended hereto.

I claim:

1. In a method of making a high temperature ceramic body wherein ceramic particles are mixed with a binder-deflocculant (BD) composition, formed into a structure and subsequently sintered, the improvement comprising the use of a binder-deflocculant comprising a guanidine salt of a polymeric acid (polyelectrolyte) having a molecular weight of from about 1,000 to about 5,000,000.

2. The method of claim 1 wherein said polymeric acid is polyacrylic acid.

3. The method of claim 1 wherein said polymeric acid is polymethacrylic acid.

4. The method of claim 1 wherein said polymeric acid is carboxymethylcellulose.

5. The method of claim 1 wherein said BD comprises from about 0.5 weight % to about 5 weight % of the ceramic mixture.

6. The method of claim 5 wherein the BD is about 2 weight % of the ceramic mixture.

7. A method of making high temperature ceramic structures wherein ceramic particles are mixed with a binder-deflocculant (BD), formed into a structure and then sintered, the improvement comprising the use of a BD comprising at least one guanidine salt of an aliphatic organic carboxylic acid having 9 to 20 carbon atoms per molecule as binder surface active agent.

8. The method of claim 7 wherein said aliphatic organic carboxylic acid is a monocarboxylic acid of the group comprising one or more of stearic acid, oleic acid, linoleic acid, lauric acid, myristic acid, palmitic acid and linolenic acid.

9. The method of claim 8 wherein said BD comprises from about 0.5 weight % to about 5 weight % of the ceramic mixture.

10. The method of claim 10 wherein the BD is about 2 weight % of the ceramic mixture.

11. In a method of making a high temperature ceramic structure wherein ceramic particles are mixed with a binder-deflocculant (BD), formed into a body and then sintered, the improvement comprising the use of a deflocculant which is a guanidine alkylsulfate having about 9 to about 20 carbon atoms per molecule as a surface active agent and wherein the binder is a guanidine salt of a polymeric acid.

12. The method of claim 11 wherein said guanidine alkylsulfate is guanidine lauryl sulfate.

13. The method of claim 11 wherein said deflocculant comprises from about 0.1 weight % to about 5 weight % of the ceramic mixture.

14. The method of claim 13 wherein said deflocculant comprises about 2 weight % of the ceramic mixture.

* * * * *